United States Patent [19]

Norton

[11] 4,121,531
[45] Oct. 24, 1978

[54] BOAT POLE

[75] Inventor: Donald S. Norton, Clinton, Miss.

[73] Assignee: Johnny Reb Lure Company, Miss.

[21] Appl. No.: 800,439

[22] Filed: May 25, 1977

[51] Int. Cl.² .................... B63B 21/54; A47K 13/06
[52] U.S. Cl. ............................. 114/221 R; 294/19 R
[58] Field of Search ............ 114/221 R, 230; 294/17, 294/19 R; 119/151-153; 116/124 R; 115/9

[56] References Cited

U.S. PATENT DOCUMENTS

| 322,019 | 7/1885 | Spencer | 294/17 |
| 764,946 | 7/1904 | Hughes | 294/19 R |
| 3,292,591 | 12/1966 | Wood | 294/19 R |
| 3,774,953 | 11/1973 | Babcock | 114/230 |
| 3,799,099 | 3/1974 | Conover | 114/221 R |

FOREIGN PATENT DOCUMENTS

| 841,396 | 7/1960 | United Kingdom | 294/19 R |
| 196,569 | 7/1967 | U.S.S.R. | 114/221 R |

Primary Examiner—Trygve M. Blix
Assistant Examiner—Charles E. Frankfort
Attorney, Agent, or Firm—Cushman, Darby & Cushman

[57] ABSTRACT

A telescoping pole is provided with a protruding-shaped foot arrangement at the foward end of its smaller diameter section. This section is provided with a sealed, flotation chamber. Protected alignment markers are provided on the smaller diameter section. The feet are provided with a device for catching a piling or the like from behind, for pulling a boat forward and with a device for guiding the pole down a fishing line for freeing a snagged lure.

6 Claims, 5 Drawing Figures

FIG. 1

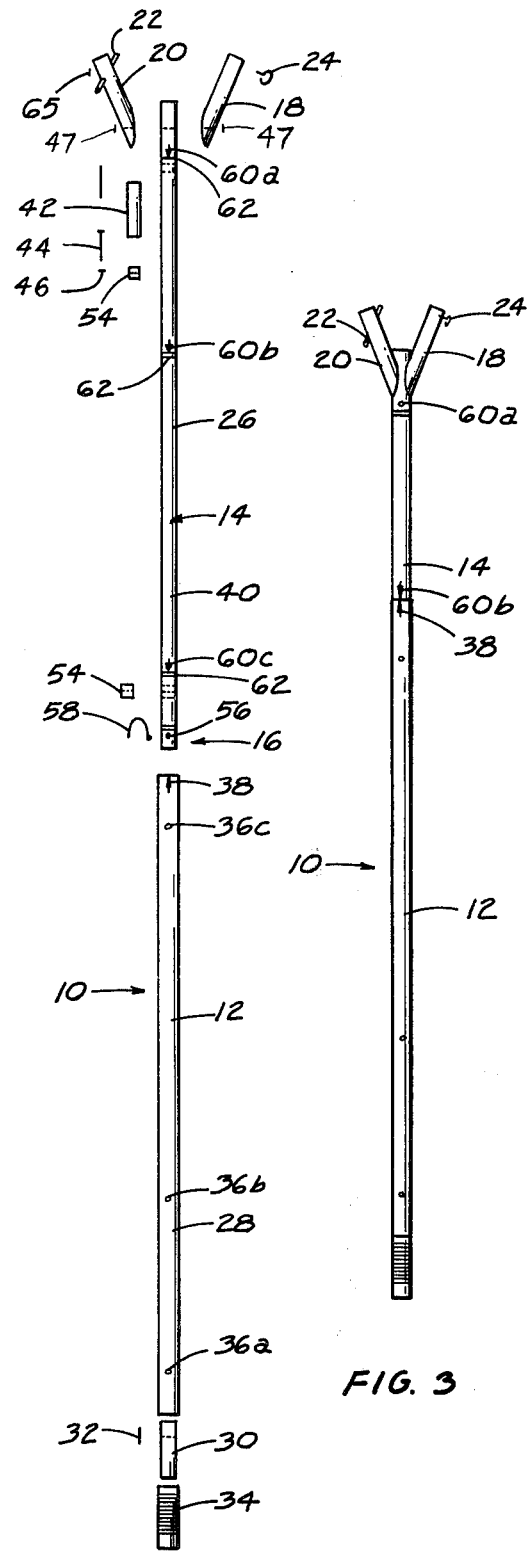
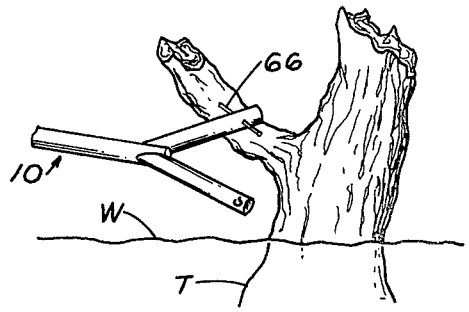
FIG. 4
FIG. 3
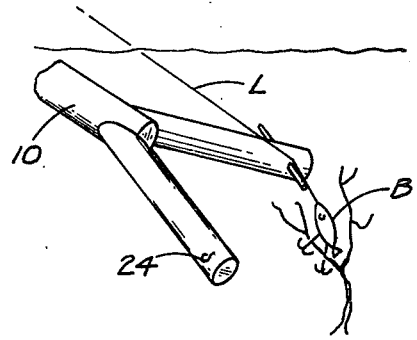
FIG. 5
FIG. 2

BOAT POLE

BACKGROUND OF THE INVENTION

The present inventor has become aware of the following prior U.S. patents which show boat poles or the like designed by others:

| Patentee | U.S. Pat. No. | Issue Date |
|---|---|---|
| Heinrich | 2,096,244 | October 19, 1937 |
| Snodgrass | 2,787,795 | April 9, 1957 |
| Snodgrass | 3,043,261 | July 10, 1962 |
| Duckett | 3,048,139 | August 7, 1962 |
| De Young | 3,861,731 | January 21, 1957 |
| Wesson | 4,004,539 | January 25, 1977 |

SUMMARY OF THE INVENTION

A telescoping pole is provided with a proturding-shaped foot arrangement at the forward end of its smaller-diameter section. This section is provided with a sealed, flotation chamber. Protected alignment markers are provided on the smaller diameter section. The feet are provided with a device for catching a piling or the like from behind, for pulling a boat fowards and with a device for guiding the pole down a fishing line for freeing a snagged lure.

The principles of the invention will be further discussed with reference to the drawing wherein a preferred embodiment is shown. The specifics illustrated in the drawing is intended to exemplify, rather than limit aspects of the invention as defined in the claims.

BRIEF DESCRIPTION OF THE DRAWING

In the drawing:

FIG. 2 is an exploded front elevation view of the boat pole;

FIG. 3 is a front elevation view of the boat pole with its sections in an intermediate condition of telescopic extension;

FIG. 4 is a fragmentary perspective view showing use of a feature of the boat pole to catch behind a tree limb, e.g. for pulling a boat forward; and FIG. 5 is a fragmentary perspective view showing use of a feature of the boat pole to slide the boat pole down along a fishing line in aid of a snagged lure.

DETAILED DESCRIPTION

Figure 1:
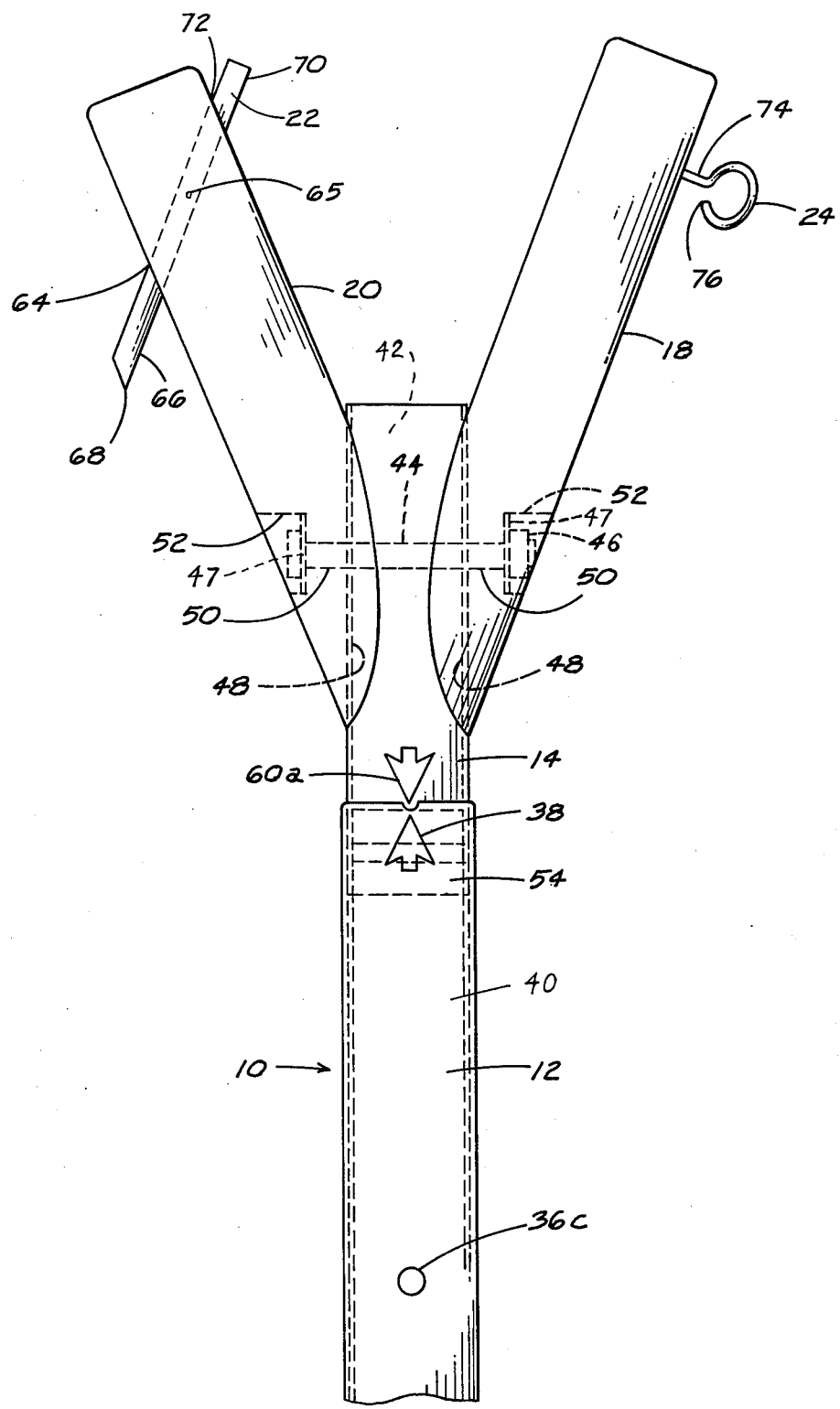
FIG. 1 is a fragmentary front elevation view of the boat pole, showing the forward portion thereof and in a fully telescopically retracted condition.

The boat pole 10 includes two sections 12, 14 which are telescopically related by sliding the smaller diameter one 14 into the forward end of the base of the larger diameter one 12, and fastening the two together at 16. At the forward end of the section 14, two feet e.g. wooden 18, 20 project forwardly at a corresponding oblique angle on opposite sides of the longitudinal axis of the pole. A stud 22 is shown provided on the foot 20 and a guide loop 24 is shown provided on the foot 22.

By preference, the pole section 14 includes a sealed, air-filled cavity 26, so that the pole 10, if dropped overboard, will float for ease of retrieval.

As shown, the pole section 12 includes a tubular body 28, e.g. made of aluminum. A short wooden dowel 30 is slid into the rear end of the lumen of the tube 28 and pinned in place by a transversally extending pin 32 filled through registered transversally extending openings in the tube 28 and dowel 30. The dowel 30 and rear end of the tube 28 are shown capped by a rubber grip 34, similar to a bicycle handlebar hand grip.

The pole section 12 is shown further provided with a series of axially spaced, transversally extending openings 36a, 36b, 36c; more or less openings could be provided in the series.

Near its forward end, the pole section 12 is externally provided with an angular alignment marker 38, the use of which will be explained below.

The pole section 14 also includes a tubular body 40.

A dowel 42 is slid into the lumen of the tube 40 at the forward end thereof and pinned in place, .e.g with a transversally extending bolt 44 and nut 46 which pass through corresponding transversally extending openings in the tube 40 and dowel 42 washers 47 are shown used in this assembly.

Axially rearwardly of the rear plug 54, an opening 56 is provided transversally through the pole section 54.

The fastener 16 comprises a spring pin 58. Fastening is effected by inserting the rear end of the section 14 into the forward end of the lumen of the section 12 and telescopically collapsing the section 14 into the section 12 until the opening 56 is aligned with an opening 36a, 36b or 36c. Then the spring pin 58 is inserted. Due to its springiness and curvature, the pin 58 will remain in place until intentionally withdrawn.

Preferably, in order to facilitate hole alignment, a series of visible markers 60a, 60b, 60c is provided on the outside of the pole section 14. The markers 60a, 60b, 60c are spaced axially as far apart as the holes 36a, 36b, 36c and angularly at such a location on the pole that the bolt and nut 44, 46 also serve to secure to diametrically opposed sites adjacent the forward end of the tube 40 a pair of feet 20. The rear ends of the feet 20 are cut with part-cylindrical concave surfaces 48 for snug fits against the outside of the tube. The bolt passes through openings 50 in the feet 20; the bolt head and the nut are received in sockets 52 formed in the feet at the outer ends of the openings 50. Thus the feet 20 extend forwardly a short distance beyond the forward end of the pole section 14, much as do the prongs on the head of a shuffle board cue.

A sealing plug 54 is forced into the lumen of the pole section 14 at each end a short distance, to provide ends for the sealed, air-filled chamber 26. Each plug 54 is typically made of rubber or wood with a girdling O-ring to ensure a water-tight seal. When a marker 60a, etc. is axially aligned with and visibly adjacent the marker 38, the opening 56 is correspondingly aligned with a respective opening, e.g. 36a on the pole section 12 so that the pin 58 may easily be inserted.

Axially just rearwardly of each marker 60a, etc. the pole section 14 is girdled by a band 62, e.g. comprising an O-ring received in a circumfrential detent. The bands 62 function to provide a firmer, less wobbly connection at 16, and, because they protrude radially above the exterior of the pole section 14, they prevent rubbing action during telescoping from wearing off the corresponding markers 60a, etc.

Near the forward end of the foot 20, an oblique opening 64 is formed at a somewhat larger, but opposite angle to the longitudinal axis of the pole 10 than the acute angle of the foot 20 to that axis. A pin or stud 22 is force fitted or pinned at 65 in the opening 64. In the instance depicted, the stud 22 projects out of both ends of the opening 64. This provides a rearwardly, outwardly projecting prong 66 whose outer end is cut off obliquely, e.g. parallel to the longitudinal axis of the foot 20 to provide a rearwardly projecting point 68.

As shown in FIG. 4, when a boater using the pole wishes to pull himself or herself closer to a stationary object, such as a tree T in the water W, the pole 10 is stuck out forwards and the prong 66 stuck into the back of the stationary object T. Next the boater pulls on the pole 10 to pull himself or herself and the boat closer to the stationary object. When proximity is reached, the prong is dislodged by giving a short, quick push on the pole. The prong angle and point disposition aid in secure gripping, then easy dislodgment.

The stud 22 as shown also provides a forwardly, inwardly projecting prong 70 which forms a forwardly opening Y-shaped guide slot at 72.

As shown in FIG. 5, when a fisherperson suffers a snagged lure B in shallow water, he or she may slip the guide slot 72 about the fishing line L, and slide the pole head down along the line until adjacent the lure. Then, by twisting the pole, and generally using the pole as a stiffer aid to the line L, the fisherperson often may succeed in freeing the lure B without losing it.

Instead of or in addition to the provision of the prong 70, the leg 18 may be provided with an almost-closed loop 24 on a shank 74 that is based in the leg 18. The line L of the stuck lure B is slipped into the loop 24 through the narrow slot 76 and the pole slip down along the line for use of the pole as described above in connection with FIG. 5.

Of course, beside the special uses described above, the boat pole 10 may also be used in the manner of a conventional boat pole to push off from a stationary object, to fend off with respect to other boats or stationary objects, to push against the muddy bottom when trying to free a lightly grounded hull, etc.

Although the pole 10 is preferably made of metal tubes, wooden dowels and rods, rubber bushings and seals and metal pins, other conventional materials may be used, e.g. in the manner such materials are used to make shuffleboard cues.

It should now be apparent that the boat pole as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A boat pole, comprising:

a first tubular section having a lumen opening through the forward end thereof;
a second, elongated section having a head at the forward end thereof and having a rear end telescopically received in the lumen of said first section;
adjustable securement means for securing the first and second sections together with each of a plurality of degress of telescopic extension of the second section relative to the first section;
means providing a hollow, sealed chamber within the second section for providing buoyancy for the pole;
the securement means comprising:
a transversally directed opening through the second section, isolated from said chamber; a series of axially spaced, transversally extending openings through the first section; and pin means insertable through the opening in said second section and any chosen one of said openings through said first section, when aligned with the opening in said second section, for pinning these two sections together, and
said boat pole further comprising:
a marker exteriorly provided on said first section and a series of axially spaced markers exteriorly provided on the second section, at such locations that the marker on the first section is juxtaposed with a respective marker on the second section when the opening on the second section is aligned with a respective opening on the first section to facilitate insertion of said pin means.

2. The boat pole of claim 1, further including:

a pair of feet extending forwardly and outwardly from the forward end of said second section.

3. The boat pole of claim 2, further including:

means providing a rearwardly, outwardly projecting prong on the outside of one foot for stabbing an object from the back to help pull the object and the user of the pole closer together.

4. The boat pole of claim 3, wherein:

the prong includes an essentially rearwardly projecting point.

5. The boat pole of claim 2, further comprising:

a guide notch formed on one foot, the guide notch being oriented to permit a fisherperson to slide the pole down along a fishing line in aid of dislodging a snagged lure.

6. The boat pole of claim 1, further including:

a protective band exteriorly provided on the second section next to each marker thereon and protruding radially above the second section for providing protection against abrasion of the markers on the second section during telescoping.

* * * * *